UNITED STATES PATENT OFFICE.

FRANCIS CORNWALL TAYLOR, OF NEW YORK, N. Y., ASSIGNOR OF TWO-THIRDS TO ROBERT C. CAMPBELL, OF PHILADELPHIA, PENNSYLVANIA, AND WILLIAM K. PECK, OF GRAND RAPIDS, MICHIGAN.

DETERGENT.

SPECIFICATION forming part of Letters Patent No. 401,766, dated April 23, 1889.

Application filed August 6, 1888. Serial No. 282,080. (No specimens.)

*To all whom it may concern:*

Be it known that I, FRANCIS CORNWALL TAYLOR, of the city, county, and State of New York, have invented a new and useful Composition of Matter Adapted for Softening Hardened Printing-Inks and the Skins Thereof, of which the following is a specification.

My composition consists of the following ingredients combined in the proportions stated, viz: Balsam of copaiba, three-fourths of a pound, apothecary's weight; glycerine, one-fourth of a pound, apothecary's weight; crude petroleum, about thirty drops; oil of sandal-wood, from one hundred and twenty to one hundred and thirty drops, according to the drying qualities of the glycerine. These ingredients are to be thoroughly mingled by agitation.

The best petroleum for the use specified, in my opinion, is crude black petroleum.

In using the above-named composition for said purpose I pour a quantity of it on a mass or hardened ink and stir the composition and ink until the ink becomes of the proper consistency for use in the printing-press, the quantity of composition added to the hardened ink depending on the amount it takes to bring the hardened ink to the proper consistency.

This composition is also useful in practicing my invention described in my application, of even date herewith, for a patent for an improvement in the art of printing in several colors at one impression of one form.

What I claim, and desire to secure by Letters Patent, is—

The herein-described composition of matter adapted for softening hardened printing-inks and the skins thereof, consisting of balsam of copaiba, glycerine, crude petroleum, and oil of sandal-wood, combined together substantially in the proportions specified.

FRANCIS CORNWALL TAYLOR.

Witnesses:
   R. C. CAMPBELL,
   EDWARD S. BEACH.